United States Patent
Mammen

(10) Patent No.: US 9,654,619 B1
(45) Date of Patent: *May 16, 2017

(54) MAPPING SIP CAUSE CODES IN A CONTACT CENTER FOR IMPROVED TRACKING OF CALL ATTEMPTS

(71) Applicant: Noble Systems Corporation, Atlanta, GA (US)

(72) Inventor: Steven K. Mammen, Woodstock, GA (US)

(73) Assignee: NOBLE SYSTEMS CORPORATION, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/822,271

(22) Filed: Aug. 10, 2015

Related U.S. Application Data

(63) Continuation of application No. 14/672,834, filed on Mar. 30, 2015, now Pat. No. 9,137,369.

(51) Int. Cl.
| | |
|---|---|
| *H04M 3/00* | (2006.01) |
| *H04M 3/22* | (2006.01) |
| *H04L 29/06* | (2006.01) |
| *H04M 15/00* | (2006.01) |
| *H04M 3/51* | (2006.01) |

(52) U.S. Cl.
CPC ...... *H04M 3/2218* (2013.01); *H04L 65/1006* (2013.01); *H04L 65/1069* (2013.01); *H04M 3/5158* (2013.01); *H04M 15/60* (2013.01)

(58) Field of Classification Search
CPC .. H04M 3/2218; H04M 3/5158; H04M 15/60; H04L 65/1006; H04L 65/1069
USPC .......... 379/265.01–266.1; 370/259–271, 370/351–357; 709/201–207, 217–248
See application file for complete search history.

(56) References Cited

U.S. PATENT DOCUMENTS

| | | | |
|---|---|---|---|
| 9,137,369 B1 * | 9/2015 | Mammem | H04M 3/08 |
| 2003/0007616 A1 | 1/2003 | Alves et al. | |
| 2005/0232410 A1 | 10/2005 | Gonzalez | |
| 2006/0149811 A1 * | 7/2006 | Bennett | H04L 65/1006 709/203 |

OTHER PUBLICATIONS

Nobles Systems Corporation, Maestro 2010.4.1 User Manual, vol. 1, Jan. 11, 2012, 486 Pages, Noble Systems Corporation, Atlanta, GA 30319.

(Continued)

*Primary Examiner* — Hemant Patel

(57) ABSTRACT

An accurate determination of the disposition of a call origination is made in a contact center by mapping Session Initiated Protocol cause codes to reflect whether a call attempt was made to a remote party. Certain cause codes reflect various conditions where a call may originate from a contact center, but for various reasons, was not offered to the remote party, or more specifically, to an interface associated with the telephone number of the remote party. Reflecting these calls as incomplete calls, as opposed to call attempts, allows the contact center to more accurately reflect the number of call attempts. Accurately tracking the number of call attempts is important to comply with various state and federal regulations regulating the number of call attempts during a given time period. Further, incomplete calls may be symptomatic of a facility failure requiring attention, causing an administrator to be alerted.

20 Claims, 10 Drawing Sheets

(56) References Cited

OTHER PUBLICATIONS

Nobles Systems Corporation, Maestro 2010.4.1 User Manual, vol. 2, Jul. 19, 2011, 422 Pages, Noble Systems Corporation, Atlanta, GA 30319.

* cited by examiner

| | | |
|---|---|---|
| Cause No. 1, | Unallocated (unassigned) number | 400A |
| Cause No. 2, | No route to specified transit network (national use) | |
| Cause No. 3, | No route to destination | |
| Cause No. 4, | send special information tone | |
| Cause No. 5, | misdialed trunk prefix (national use) | |
| Cause No. 6, | channel unacceptable | |
| Cause No. 7, | call awarded. being delivered in an established channel | |
| Cause No. 8, | preemption | |
| Cause No. 9, | preemption circuit reserved for reuse | |
| Cause No. 10, | normal call clearing | |
| Cause No. 17, | user busy | |
| Cause No. 18, | no user responding | |
| Cause No. 19, | no answer from user (user alerted) | |
| Cause No. 20, | subscriber absent | |
| Cause No. 21, | call rejected | |
| Cause No. 22, | number changed | |
| Cause No. 26, | non selected user clearing | |
| Cause No. 27, | destination out of order | |
| Cause No. 28, | invalid number format (address incomplete) | |
| Cause No. 29, | facilities rejected | |
| Cause No. 30, | response to STATUS INQUIRY | |
| Cause No. 31, | normal, unspecified | |
| Cause No. 34, | no circuit/channel available | |
| Cause No. 35, | Call Queued | |
| Cause No. 38 | network out of order | |
| Cause No. 39, | permanent frame mode connection out of service | |

FIG. 2A

| Cause No. 40, | permanent frame mode connection operational |
|---|---|
| Cause No. 41, | temporary failure |
| Cause No. 42, | switching equipment congestion |
| Cause No. 43, | access information discarded |
| Cause No. 44, | requested circuit/channel not available |
| Cause No. 46, | precedence call blocked |
| Cause No. 47, | resource unavailable - unspecified |
| Cause No. 49, | Quality of Service not available |
| Cause No. 50, | requested facility not subscribed |
| Cause No. 52, | outgoing calls barred |
| Cause No. 53, | outgoing calls barred within CUG |
| Cause No. 54, | incoming calls barred |
| Cause No. 55, | incoming calls barred within CUG |
| Cause No. 57, | bearer capability not authorized |
| Cause No. 58, | bearer capability not presently available |
| Cause No. 62, | inconsistency in outgoing information element. |
| Cause No. 63, | service or option not available, unspecified |
| Cause No. 65, | bearer capability not implemented |
| Cause No. 66, | channel type not implemented |
| Cause No. 69, | requested facility not implemented |
| Cause No. 70, | only restricted digital information bearer capability is available (national use) |
| Cause No. 79, | service or option not implemented unspecified |
| Cause No. 81, | invalid call reference value |
| Cause No. 82, | identified channel does not exist |
| Cause No. 83, | a suspended call exists but this call identified does not |
| Cause No. 84, | call identity in use |

| | | |
|---|---|---|
| Cause No. 85, | no call suspended | |
| Cause No. 86, | call having the requested call identity has been cleared | |
| Cause No. 87, | user not a member of CUG | 400C |
| Cause No. 88, | incompatible destination | |
| Cause No. 90, | non existent CUG | |
| Cause No. 91, | invalid transit network selection (national use) | |
| Cause No. 95, | invalid message - unspecified | |
| Cause No. 96, | mandatory information element is missing | |
| Cause No. 97, | message type non existent or not implemented | |
| Cause No. 98, | message not compatible with call state or message type non existent or not implemented | |
| Cause No. 99, | Information element / parameter non existent or not implemented | |
| Cause No. 100, | Invalid information element contents | |
| Cause No. 101, | message not compatible with call state | |
| Cause No. 102, | recovery on timer expiry | |
| Cause No. 103, | parameter non existent or not implemented - passed on (national use) | |
| Cause No. 110, | message with unrecognized parameter discarded | |
| Cause No. 111, | protocol error, unspecified | |
| Cause No. 127, | Interworking - unspecified | |

FIG. 2C

INCOMPLETE CALL REPORT — 700

| | Date — 705 | Campaign — 710 | # of Incomplete Calls — 715 | % — 720 | Abnormal Condition — 725 | PRI Channels — 730 |
|---|---|---|---|---|---|---|
| 1. | 03-05-2015 | Collect-1 | 23 | .001 | No | 3-9+ |
| 2. | 03-06-2015 | Sales-1 | 5 | .004 | No | 5-15+ |
| 3. | 03-07-2015 | Sales-2 | 12,200 | 9.8% | YES | 2-14 |
| 4. | 03-07-2015 | Collect-1 | 9,560 | 8.7% | YES | 2-14+ |

MAPPING SIP CAUSE CODES IN A CONTACT CENTER FOR IMPROVED TRACKING OF CALL ATTEMPTS

CROSS REFERENCE TO RELATED APPLICATIONS

This application is a continuation of U.S. patent application Ser. No. 14/672,834, filed on Mar. 30, 2015, entitled Mapping ISDN Cause Codes In A Contact Center For Improved Tracking Of Call Attempts, the contents of which are incorporated by reference.

FIELD OF INVENTION

The field of the invention generally pertains to contact centers, and specifically, how a contact center can improve tracking call attempts to a telephone number by mapping SIP cause codes provided by a carrier.

BACKGROUND

Contact centers are used to contact individuals for different purposes, including for debt collection calls. As such, these debt collection calls may be regulated by various state and/or federal regulations, which govern how the debtors may be contacted. These regulations may proscribe not only how the debtor is contacted, but when the debtor may be contacted, and the number of attempts that may occur in attempting to contact the debtor during a time period. For example, the number of call attempts that may be made to a debtor may be regulated. Oregon, for example, allows a telephone call to a debtor's place of employment only if the debt collector in good faith has made an unsuccessful attempt to the debtor's residence during the day or during the evening between the hours of 6 p.m. and 9 p.m. Further, the debt collector may not contact the debtor at the debtor's place of employment more frequently than once each business week. There may be other state or federal regulations governing other aspects of how many calls may be attempted to a telephone number in various circumstances. Further, contact centers may have internal policies governing the number of call attempts that may be made.

It is evident that accurately tracking how many call attempts are made to a telephone number is important, since exceeding a limit may result in the debt collector liable for penalties, civil actions, or other adverse consequences. However, accurately tracking call attempts is not precisely defined by statute. Various technologies are available which allow a greater precision in determining how many call attempts actually occurred. Thus, improved approaches are needed for determining the number of call attempts to a telephone number for regulatory purposes. It is with respect to these considerations and others that the disclosure herein is presented.

BRIEF SUMMARY

Technologies are generally presented herein pertaining to systems, methods, and non-transitory computer readable media for tracking calls that originate in a contact center that are directed to a remote party. Call originations resulting in a call offered to the remote party are categorized as a call attempt, whereas calls that do not result in a call being offered to the remote party are categorized as an incomplete call. Call attempts to the remote interface result in incrementing a call attempt counter for that number, whereas incomplete calls to that number doe not result in incrementing the call attempt counter for that number.

If the number of incomplete calls exceeds a threshold value of some form, then an alert or other form of notification may be generated, indicating a potential abnormal operational condition. In addition, reports may be generated that provide further information surrounding the occurrence of incomplete calls.

The subject matter disclosed herein may be implemented as a computer-controlled apparatus, a computer process, a computing system, or as an article of manufacture such as a non-transitory computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 2A-2C illustrates various ISDN cause code values.

FIG. 7 illustrates one embodiment for a report on the number of incomplete calls.

DETAILED DESCRIPTION

Figure 1:
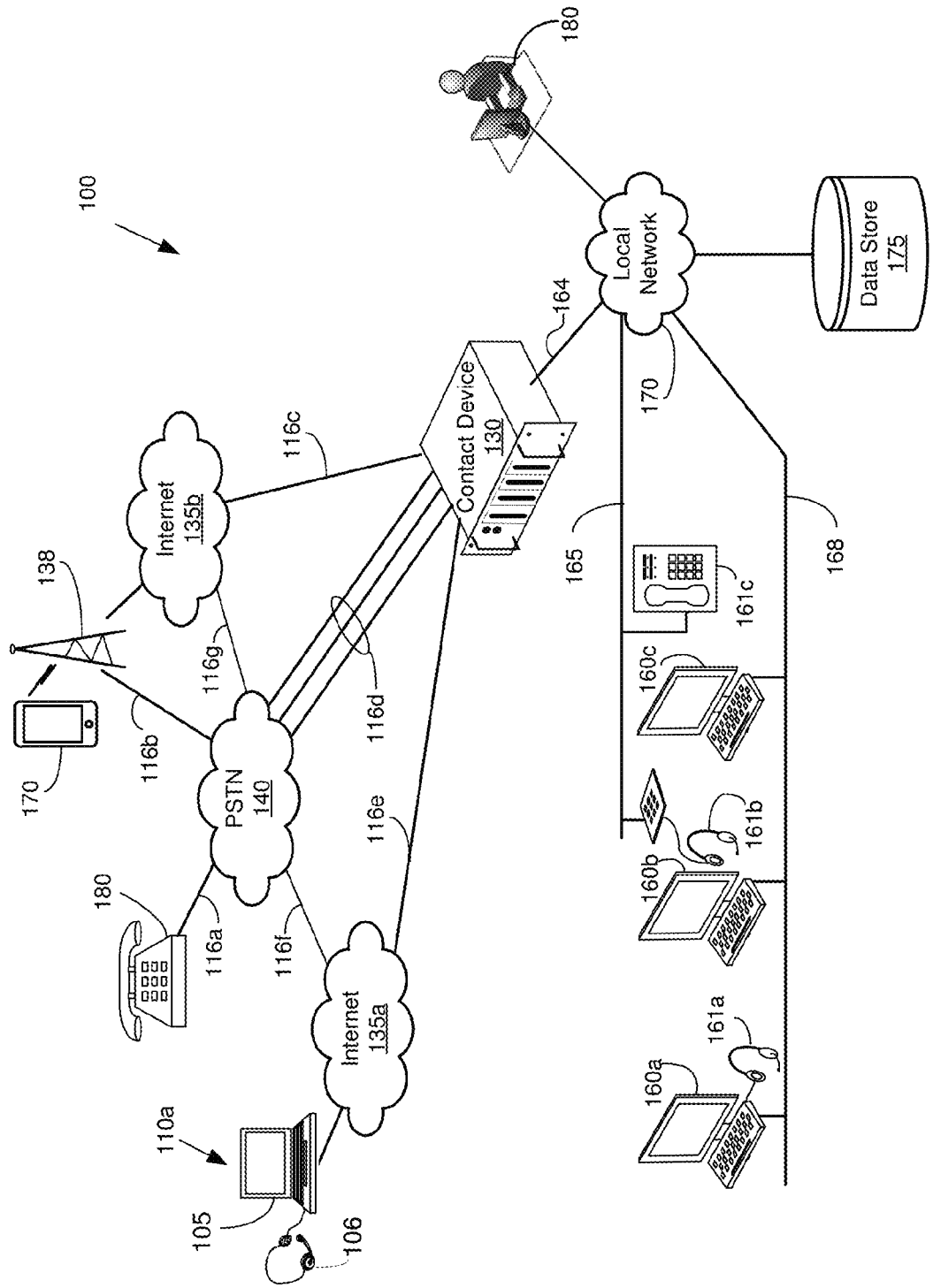
FIG. 1 illustrates a system architecture that may be used by an enterprise to originate calls to a called party.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

GLOSSARY

The following terms are to be given the following meanings in this specification, when used in the appropriate context. Any examples included in a definition are not intended to be exclusive or limiting, but merely illustrative.

Alert—a notification informing the recipient of a detected condition.

Administrator—a person working in a contact center tasked with administering the operation and equipment in the contact center.

Dialer—a call handler in a contact center designed to originate calls to remote parties and connect such calls to agents. A dialer accommodates multiple agents (i.e., a device capable of connecting only a single user is not considered to be a dialer in a contact center).

Disposition (also, "dispositioning a call")—providing information to a call handler indicating status information about a call. This may be provided manually by the agent or by the call handler itself (e.g., detecting and reporting a busy condition). Typically, this information is stored or associated with the telephone number or calling record.

Call—a voice-based telephone call. For purposes of this application, the term "call" in the claims does not encompass short message service ("SMS") text messages.

Call Attempt—a call initiated in a contact center resulting in the call being offered to the remote party, i.e., the call is offered by a voice service provider to the remote interface of the phone device used by the remote party.

Call Attempt Counter—a counter maintaining a current value of the number of call attempts to a particular telephone number. The call attempt counter is usually associated with a certain time period (e.g., daily). The value can be reset when associating the counter with a new time period (e.g., when starting a new day).

Call Handler—a device in a contact center that processes calls for a plurality of agents. This may include incoming and outgoing calls.

Call Origination—the process of originating a call in a contact center to a voice service provider, regardless of whether the call was actually offered to the remote party. Typically, under normal conditions, a call origination usually results in the call being offered to the remote party.

Call Record—a record in a call list indicating information including a telephone number.

Cause Code—information provided in an element in the ISDN protocol indicating a reason associated with the occurrence (or lack thereof) of an event. Typically, in the context used herein, the cause code is associated an event associated with a prior call origination attempt.

Cause Code Number—a numerical value indicated in a cause code parameter. This may also be referred to as the "cause code value."

Cause Code Parameter—a protocol element conveying the cause code number.

Dialing List—a set of call records.

DISCONNECT (or "DISC")—a message in the ISDN protocol which may convey a cause code parameter indicating a cause code value.

Increment the [ . . . ] Counter—increasing a numerical value by one of a counter tracking the number of occurrences. For example, "incrementing the call attempt counter" means to add one to the current value of the call attempt counter.

Incomplete Call—a call origination which did not result in the call being offered to the remote party, or more specifically to the remote interface. This may be due to, e.g., network congestion or other forms of network failures which prevented the call from being offered at the remote interface.

Incomplete Call Counter—a counter maintaining a current value of the number of incomplete calls.

Internetwork Interface—a network interface between, e.g., two voice service providers.

ISDN Interface—an interface based on a telecommunications protocol associated with the ISDN protocol, characterized as having various characteristics, including an out-of-band signaling channel that conveys signaling information related to another channel conveying user information, such as voice. The interface may adhere to, or be based on, on one of the various standardized versions of the protocol. Proprietary versions of the ISDN protocol are considered to be within the scope of this term.

ISDN Message—one of the messages conveyed over the ISDN interface.

Number—depending on the context, this may refer to a telephone number or an absolute number. For example, "dialing a number" refers to a telephone number, whereas the "number of attempts" refers to an absolute number.

PSTN—Public Switched Telephone Network. A type of telephone voice service provider.

Remote Interface—the interface of the called party with their corresponding voice service provider. The remote interface is associated with a telephone number and may be based on various technologies.

Telephone Service Provider—a voice service provider providing telephone service via an ISDN interface.

Voice Service Provider—a service provider that provides phone service, regardless of the technology used. This would include a telephone service provider and a voice over IP service provider.

Wallboard—information provided in real time (or near-real time) about the status of various parameters or operational aspects in a contact center.

Wallboard Element—a particular grouping of information in a wallboard related in a common aspect.

FIG. 1: Contact Center Architecture Overview

FIG. 1 shows one embodiment of a contact center architecture 100 illustrating the various technologies and components that may be involved when practicing the principles and concepts of the invention. The contact center shown in FIG. 1 may process voice calls that are inbound-only, outbound-only, or a combination of both (sometimes referred to as a "blended" contact center). For purposes of this invention, the focus is primarily on outbound calls or communications from the contact center because the purpose is to provide ascertain whether a call that originated from the contact center was offered to the remote interface of the called party. In some instances, the contact center may be referred to as a call center, and this may also be used when referring primarily to the context of handling voice calls in the contact center. Although many aspects of the contact center's operation are disclosed in the context of voice calls, in various embodiments, the contact center may process other forms of communication such as, facsimiles, emails, text messages (such as IM or SMS), video calls, and chat messages. However, for purposes of this invention, the calls referred to herein are voice calls.

Since the contact center may handle calls originating from a calling party, or initiated to a called party, the term "party" or "remote party" without any further qualification, refers to a person associated with a call handled by the contact center, where the call is either received from, or placed to, the party. Depending on the embodiment, outbound voice calls may originate to the called party that uses a variety of different phone types. For instance, the called party may receive a call at a conventional analog telephone 180 connected to a public switched telephone network ("PSTN") 140 using an analog plain old telephone service ("POTS") line 116*a*. The call may be routed by the PSTN 140 and may comprise various types of facilities 116*d*, including, but not limited to: T1 trunks, SONET based fiber optic networks, ATM networks, IP-based facilities, etc. Various types of routers, switches, bridges, gateways, and other types of equipment or protocols may be involved in the processing of the calls.

Outbound communications may also be directed from the contact device 130 to the individual's smart phone device 170, but the remote party's device could also be a mobile phone, tablet, or other mobile device, which wirelessly communicates with a mobile service provider ("MSP") 138. The voice calls may be routed to the PSTN 140 using an integrated services digital network ("ISDN") interface 116*b* or other types of interfaces that are well known to those skilled in the art. The ISDN interface may be a Primary Rate Interface ("PRI"), which comprises 24 channels—one signaling or D channel, and 23 bearer or "B" channels. The ISDN protocol may interwork with the Signaling System No. 7 ("SS7") protocol as is well known by those skilled in the art, and may convey information as to why a call was unable to be offered to the remote interface. This information may be conveyed back to the contact device 130 using the ISDN protocol on the ISDN interface 116*d*.

In particular embodiments, the MSP 138 may also route calls as packetized voice, also referred to herein as voice-over-IP ("VoIP") to/from an Internet provider 135*b* using Internet-based protocols. For convenience, unless indicated otherwise, the term "trunk" refers to any type of facility 116*c*, 116*d*, or 116*e* providing communication to, or from, the contact center, regardless of the type of protocol or technology used. Specifically, a "trunk" is not limited to time-division multiplexing ("TDM") technology. Outbound communications calls may also be directed to a called party employing a so-called "IP phone," "VoIP phone," or "soft phone" 110*a*. In one embodiment, this device may comprise a computing device 105, such as a laptop, computing tablet, or other electronic device, which processes voice data and interfaces with a headphone/microphone combination, also referred to as a headset 106. The computing device 105 may in turn be connected to an Internet provider 135*a*. Those skilled in the art will recognize that a variety of protocols and facilities may be used to convey voice calls and a variety of VoIP phone embodiments.

In some embodiments, a contact device 130, such as a dialer (e.g., predictive dialer), may be used to originate outbound calls at a rate designed to meet various criteria, such as when agents are expected to be available. A predictive dialer is a type of dialer that may originate calls to multiple telephone numbers simultaneously, with the expectation that agents will be available to handle one or more of the calls that are answered. Other types of dialing methods may be used, such as preview dialing. For this dialing method, information about an account is displayed to an agent to review and after the agent becomes familiar with the account status, the agent indicates to the dialer that the call may be originated to the account. In this way, when the called party answers the phone, the agent can interact with the individual in an effective way. The contact device 130 may also originate a call and play an announcement, or connect the call to an interactive voice response system (not shown) which plays the announcement. The contact device 130 may be a dialer that interfaces with a plurality of ISDN PRIs 116*d* to the PSTN 140.

The contact device 130 may be configured so that it attempts to establish communication with an individual using telephone numbers stored in a data store 175. A dialing list may be stored in the data store, wherein the dialing list comprises a record for each account or number that is to be dialed. For example, a first telephone number may be used and if no answer is encountered, then a second telephone number associated with the individual may be used. These may be in the same call record or in multiple call records. Once a call is answered, the contact device 130 may connect the call to an available agent by connecting the outbound call leg to the called party with another call leg that has been established to an available agent using contact center communication facilities 165. Other embodiments may connect the call to an IVR. Depending on the embodiment, the facilities 165 may be any suitable technology for conveying the call, including but not limited to a local area network ("LAN"), wide area network ("WAN"), ISDN, or conventional TDM circuits.

In other embodiments, the outbound call leg may be connected to a call leg established to the agent's phone using a local network 170 over facilities 168. The exact details typically depend in part on the technology used. For example, the facilities 165 may be, in one embodiment, analog or proprietary voice communication technology whereas facilities 168 may be, e.g., SIP oriented. As may be appreciated, there are various technologies and configurations that are possible.

An agent typically uses a computing device 160*a*-160*c*, such as a personal computer, and a voice device 161*a*-161*c*. The combination of computing device 160*a*-160*c* and voice device 161*a*-161*c* may be referred to as a "workstation." In many instances, the computing device also handles VoIP so that reference to the "computer workstation" or the "agent's computer" may refer to the computer processing device of the workstation, that may be closely integrated with handling voice as well. Thus, for these particular embodiments, the workstation can be assumed to have at least a data capability and may have a voice capability.

Depending on the embodiment, the interaction between the contact device 130 and agent computers 160*a*-160*c*, as well as other components, may involve using a local area network ("LAN") 170. In particular embodiments, when an agent is interacting with the called party, the agent may use their computer 160*a*-160*c* to further interact with other enterprise computing systems, which may provide account level information to the agent. Typically, when a dialer connects the agent to an outbound call leg, data may also be presented to the agent using the agent's computer using facility 168. This may provide information about the called party, such as their associated account related information.

In addition, a contact center administrator 180 is shown. The administrator may use a separate computer to access the contact center components using the LAN 170. The administrator may be able to access various administrative interfaces to configure, check or otherwise manage the contact device 130, in order to configure the operation of the contact device. For example, in one embodiment the administrator can establish how the contact device is to interpret various ISDN cause codes that may be received in messages from the various ISDN PRI interfaces 116*d*. The administrator can define which cause codes are to be categorized as indicating an incomplete call. Further, the administrator may also receive various forms of alert, notifications, or reports at their workstation computer indicating how many calls were originated and/or completed.

Although a number of the above entities may be referred to as a "component," each may also be referred to in the art as a "computing device," "unit", "server", or "system." A component may incorporate a local data store and/or interface with an external data store. Use of the word "server"

does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Service Concepts

Contact centers that originate calls need to track the outcome of each call. The outcome of a call usually has been conventionally limited to a small number of possibilities. One outcome is that the call is answered. The call may be answered by the remote party (e.g., a human) or the call may be answered by an answering machine. This would include situations where the remote party has voice mail service. In the former instance, the person may own and operate the answering machine whereas in the later instance, a service provider may own and operate the answering machine and provide voice mail as a service.

In other situations, the call may go unanswered. A common occurrence is that the remote party's phone is rung, but there is no answer, and there is no answering machine to answer the call (nor voice mail). Another occurrence is that the remote party's phone line is in use, and a busy signal is provided to the originating party. A less common occurrence is that the number may be disconnected or reassigned. These last two situations are typically indicated by the service provider playing a cadence of three tones (sometimes calls "tri-tones") followed by an announcement indicating that the number is no longer in service.

In these situations, the contact center can usually readily ascertain which outcome has occurred. For example, the purpose of the tri-tones is to provide a signal to automated phone equipment that the number is not in service, has been reassigned, etc. Contact centers have incorporated equipment to detect such tri-tones and can readily ascertain such occurrences. When the phone is ringing, but unanswered, similar equipment in the contact center can detect the presence of ringing tones and ascertain the phone is not answered. The equipment can also detect when a busy signal is received.

Detecting the presence of an answering machine may be a little more complicated. Merely detecting the presence of a voice provided by the remote party does not allow distinguishing between a person answering the call and the greeting of an answering machine that has answered the call. However, other characteristics known to those skilled in the art may be used to distinguish between the two occurrences. For example, the timing of the initial speech may suggest whether a person or answering machine is providing the speech.

Consequently, contact centers interfacing with the PSTN for call origination are typically able to disposition a call as: answered by a human, answered by an answering machine, busy, no answer, and out-of-service. The exact name allocated to the "out-of-service" occurrence may be different, and in some embodiments, a sub-category may be defined to reflect various conditions. However, the "out-of-service" label reflects that further attempts should not be made to that number and that the call was not answered, nor busy, nor unanswered. Thus, assuming the number is a functional number (valid, assigned, and in service), the call dispositions are:

1) busy,
2) no answer,
3) answered (i.e., answered by a human), and
4) answering machine (i.e., answered by an answering machine).

In the case when the call is answered, the intended person may have answered the call. In such instances, the call is said to have reached a "right party connect" or RPC status. If the call was answered by some other person, it may be referred to as a "wrong party connect." Ascertaining this situation may be beyond the capabilities of the equipment in the contact center, as it may require a human agent asking the answering party whether they are the desired party. Alternately, an interactive voice response unit may be used to ask the party if they are the right party. This may depend on the nature of the call. For example, if a survey is being taken, it may be that any party answering party is capable of providing results. However, if the call is a debt-collection call, the agent may be seeking to speak only with the debtor, not just any person answering the call.

It may be important to track how many call attempts have been made to a particular telephone number associated with remote party. For various reasons, tracking the number of call attempts may be required in order to comply with a state or federal regulations. For example, one state, Oregon, has laws governing the number of call attempts that can be made to a telephone number when attempting to reach a debtor. Oregon, for example, allows a telephone call to the debtor's place of employment only if the debt collector in good faith has made an unsuccessful attempt to telephone the debtor at the debtor's residence during the day or during the evening between the hours of 6 p.m. and 9 p.m. Further, the debt collector may not contact the debtor at the debtor's place of employment more frequently than once each business week. A contact center may also have internal policies governing how many attempts may be made to a given telephone number in an attempt to reach the desired party. This may be viewed as harassment, so that call attempts are limited for a given time period.

Current technology (such as calling number delivery or "ANI"—automatic number identification) allows a party offered a call to readily review how many incoming calls they received which were not answered, when they were received, and the name of the originating party. In various contexts, receiving a number of calls by the same originating party, which were unanswered, may be considered as harassment. For example, a person who works during the day at a business would typically not be able to answer calls to their residence. However, many phones have the ability to display the calling number, and the person reviewing a large number of incoming calls from the same number may view this as harassment, even though the intended party did not hear the phone ringing. Consequently, contact centers carefully track the number of call attempts to a given number.

While there may not be an applicable definition for "call attempts" in each context where the term applies, the issue arises whether a "call attempt" refers to an attempt of the contact center in originating a call to the remote party or whether a "call attempt" refers to a call originated by the contact center that is offered to the remote party. If every call originated at the contact center resulted in a call being offered to the remote party, then this issue would be moot. In most instances, calls attempted by an originating party result in a call being offered to the remote party.

However, there are instances where this is not the case. Specifically, there are a variety of conditions which can cause a call that is originated by a contact center and received by a voice service provider, to not complete. For example, the voice service provider may drop, block, or is otherwise unable to complete the call to the destination. For example, network congestion may prevent a call from being routed to the destination, e.g., the remote interface. This may be due to various component failures, such as a network switch may have failed, and attempts to reroute the call by the switch may have caused the call to fail. Trunks between the switches in the PSTN or within a voice service provider's network may have failed. Errors in routing may have resulted in a call being handed back and forth between carriers, without completing to the remote interface of the remote party. The remote party may be a wireless user, and they have turned off their phone, and may not have their voice mail service activated. There are a variety of conditions which may occur in which a call may be unable to be offered to the remote party or rerouted to that party's voice mail.

In such cases, it may be argued that there was no "call attempt" made to the remote party. If the call was not offered to the remote party's interface, then there would be no record of receiving such a call attempt at the remote party. Thus, such call originations from a contact center which cannot be routed because of various conditions (e.g., network congestion) should not be counted as a call attempt with respect to the called party. Consequently, as used herein, a "call attempt" refers a call origination which results in a call being offered to the remote party's interface.

Tracking the number of call attempts can be accomplished using a counter, called a "call attempt counter." Tracking the number of call attempts inherently involves a time period. That is, the tracking implies a particular starting point in time, which may be each day, week, or some other time period. Consequently, any counter tracking the number of call attempts implies some sort of point of time at which tracking started. Frequently, the call attempt counter may be reset for various reasons. For example, if a policy or regulation indicates no more than one call to a number per day, the counter may be reset each day. Further, there may be a number of counters associated with each telephone number. This is because there may be multiple requirements governing the number of call attempts to a number. For example, a policy may state no more than one call attempt per day, and no more than three per work week. This may require allocating two call attempts counters for that same number.

Contact centers interworking with the PSTN may not always know when a call origination results in a call attempt at the destination interface. In cases when a call origination does not result in a call attempt, the contact center may erroneously disposition the call as a busy or no-answer, even though the call was not offered to the remote interface. This may have originated when interworking with conventional telephone interfaces which did not convey detailed information as to why the call did not complete. While dispositioning a call in this manner may be technically inaccurate, in the past, the consequences for doing so were not onerous. However, being able to accurately disposition the call would allow the contact center to more accurately track the number of call attempts, that is, the number of calls which actually did result in a call to the destination interface. In instances where a call attempt did not occur due to, e.g., network congestion, the contact center may be able to reattempt the call at a later time without exceeding a policy or regulation regarding the number of call attempts.

With the deployment of ISDN, contact centers using ISDN interfaces to a carrier are able to receive detailed information about the progress of a call that was previously not possible using conventional T1 facilities. Contact centers frequently use a form of ISDN known as a "primary rate interface" ("PRI") which comprises one signaling channel and 23 bearer channels (e.g., voice channels). The signaling channel allows detailed information to be conveyed between the voice service provider and the contact center about the status of the call. This information may also include information from remote networks, which is passed back to the originating network.

For example, when a call is not answered, the network may initiate termination of the call, frequently called a "release procedure." On the ISDN interface, call disconnection typically involves transfer of a RELEASE message (often abbreviated as "REL" or "RELease"). The RELEASE message may contain various parameters providing additional information. One of these parameters is called the "cause code" and provides additional information as to what caused the RELEASE message to be sent.

Various values of the cause codes are shown in FIG. 2A-2C. Many of these values may be infrequently used. However, several of the cause codes identified below may be occasionally encountered by the contact center. These include:

Cause Code No. 17—user busy
Cause Code No. 22—number changed
Cause Code No. 19—no answer from user (user alerted)

From the perspective of the contact center dispositioning the calls, such codes could be mapped to a busy status, out-of-service status, and a no answer status respectively. In the case of the "user busy" and "no answer" cause codes, it can be inferred that a corresponding call offering was made at the remote interface, but call completion was not able to occur because of the described situation.

Other cause codes indicate that the call was not offered to the remote interface. These would include, for example:

Cause Code No. 38—network out of order
Cause Code No. 41—temporary failure
Cause Code No. 42—switching equipment congestion
Cause Code No. 47—resource unavailable, unspecified.

These, and other codes, reflect that the call could not be processed to the remote interface for a variety of reasons. The problem may arise with the equipment in the switching serving the contact center, malfunctioning of the communication facilities between the contact center and the PSTN, malfunctions within the PSTN, malfunctions between the PSTN and an interexchange carrier, malfunctions in the interexchange carrier, malfunctions in the remote voice service provider, or malfunctions in the switching equipment or facilities serving the called party. No doubt those skilled in the art will be able to identify other potential failures.

These types of cause codes reflect that the call that was initiated in the contact center, but did not result in a call being offered to the remote party. In essence, a call attempt did not occur. The perspective of whether a "call attempt" occurred is therefore viewed from the perspective of the remote interface, not at some point earlier in the transport of the call. In such situations, the contact center should not consider the call origination to be a call attempt, and should not disposition the call as busy, no answer, or some other condition.

The contact center may implement a different counter, an "incomplete call" counter that is incremented when certain cause codes occur. The incomplete call counter is incremented for each call origination in the contact center which did not result in a call attempt, e.g., a call offered to the remote party. In addition, in such situations, the call attempt counter is not incremented. Typically, when one counter is incremented, the other one is not.

It should be evident that "a call offered to the remote party" should be construed to mean that a call is offered to the destination interface associated with the telephone number of the phone device used by the remote party. Obviously, a call is made to a telephone number, which is associated with a device, and receiving a call requires some sort of phone device. Thus, it is commonly understood that the colloquial expression of offering a call to a person is understood as referring to a call being offered to destination interface identified by a telephone number, which may be associated with a particular phone device. In various cases, the phone device could be a conventional phone, a SIP or VoIP phone, a wireless phone, etc.

Process Flow for Handling Cause Codes

Figure 3:
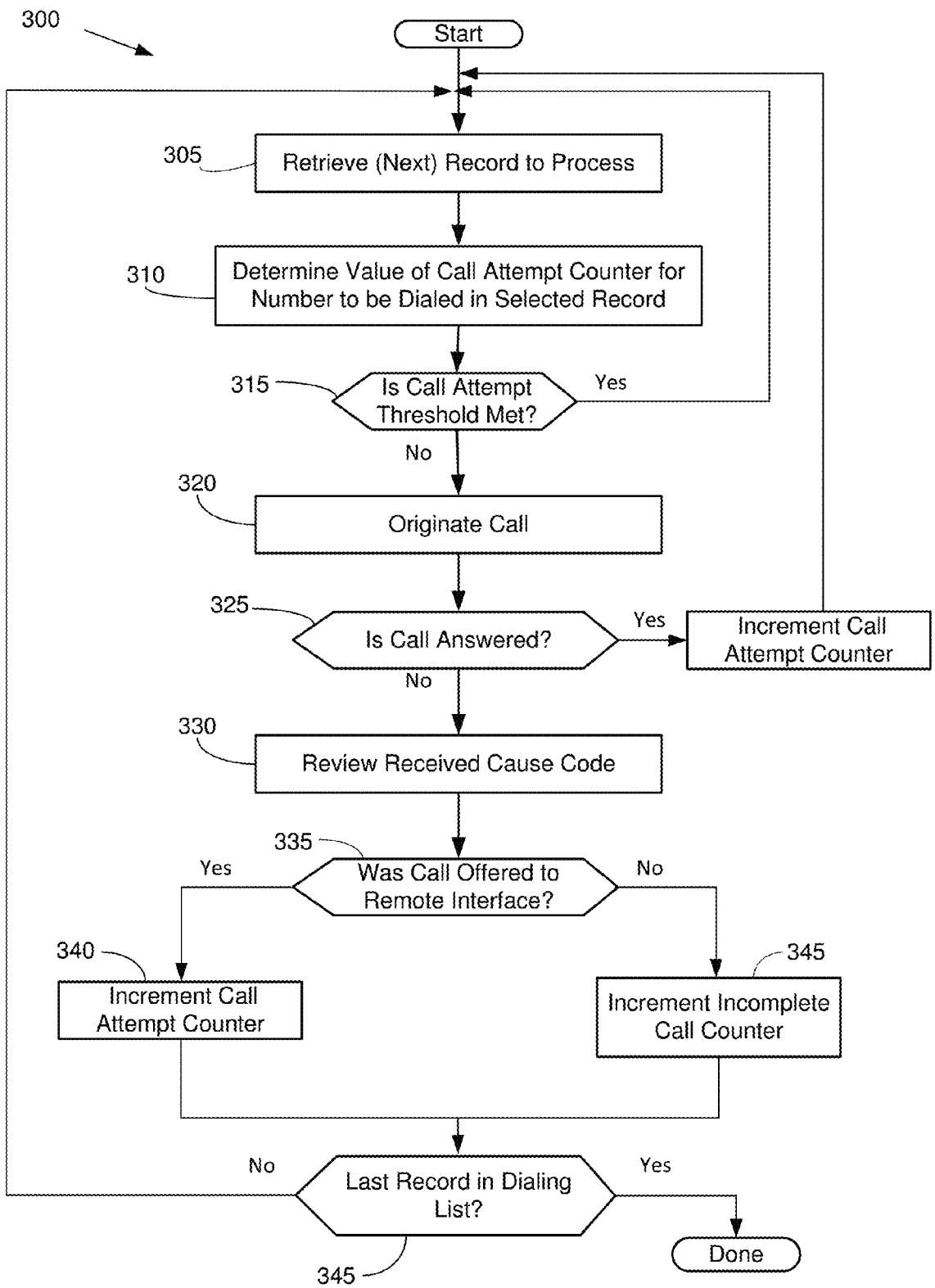
FIG. 3 illustrates one embodiment of a process flow that may be used in a dialer for determining whether to originate a call to a telephone number.

FIG. 3 illustrates one embodiment of a process flow for processing cause codes received in a RELEASE message on an ISDN interface at the call handler. The process 300 shown in FIG. 3 begins with retrieving a call record from the dialing list in operation 305. The call record has at least one telephone number that is used for establishing a call to the remote party. The record may also store on or more call attempt counters indicating the number of call attempts. The call attempt counter is associated with a particular telephone number in the call record. Further, there may be more than one call attempt counter associated with the telephone number, as multiple counters may be used to track different time periods. For example, the number of attempts made during the current day versus the past seven days. Further, if there are different numbers in the call record, each of these may have different call attempt counters associated with them.

In any case, the applicable call attempt counter is identified and the value is determined in operation 310, and a test is made to see if the current value meets a threshold level in operation 315. Each call attempt counter may have a different threshold level. For example, a call attempt counter tracking the number of call attempts in the current day may have a threshold value of one, reflecting one call per day. Another call attempt counter for the same number, but tracking the number of call attempts during the week may have a threshold of three, reflecting a limit of three calls per week. If the threshold is met, then no further attempts should be made, and the process returns to operation 305 where the next record is retrieved and processed.

If however, the call attempt threshold is not met in operation 315, the call may then be originated in operation 320. If the call is answered (whether by a person or answering machine) in operation 325, then the next operation is to increment the call attempt counter. When the call is answered at the remote interface, it follows that a call was offered. Thus, it is appropriate to increment the call attempt counter. The process then return to process the next call record in operation 305.

If the call is not answered in operation 325, then a RELEASE message will be received indicating a cause code. The cause code value is reviewed in operation 330 to ascertain the additional information indicated by the cause code.

Next, a test occurs in operation 335 to ascertain whether the call was offered to the remote interface. This could be a table driven process where certain fixed cause codes are defined as resulting in taking the "yes" or the "no" branch from operation 335. If the cause code indicates the call was not offered to the remote interface, then the incomplete call counter is incremented in operation 345. Otherwise, if the cause code indicates the call was offered to the remote interface, then the call attempt counter for that telephone number is incremented in operation 340. Note that not all embodiments are required to implement an incomplete call counter, but doing so allows tracking such call failures, and a threshold value can be defined which when exceeded causes alerts or notifications to be generated.

If the call record just processed was the last record in the dialing list, then the process is completed. Otherwise, the process loops back to operation 305 where the next record is obtained and processed. In this manner, an accurate counter of actual call attempts, as well as incomplete calls, may be accounted for.

In some embodiments, different types of incomplete call counters may be defined. These could reflect the various types of call failures that may be indicated by the cause code. Those, errors associated with the serving network could be distinguished from a remote network. This may allow the contact center operator to have greater insight into the various reasons of call failures and react differently.

Figure 4:
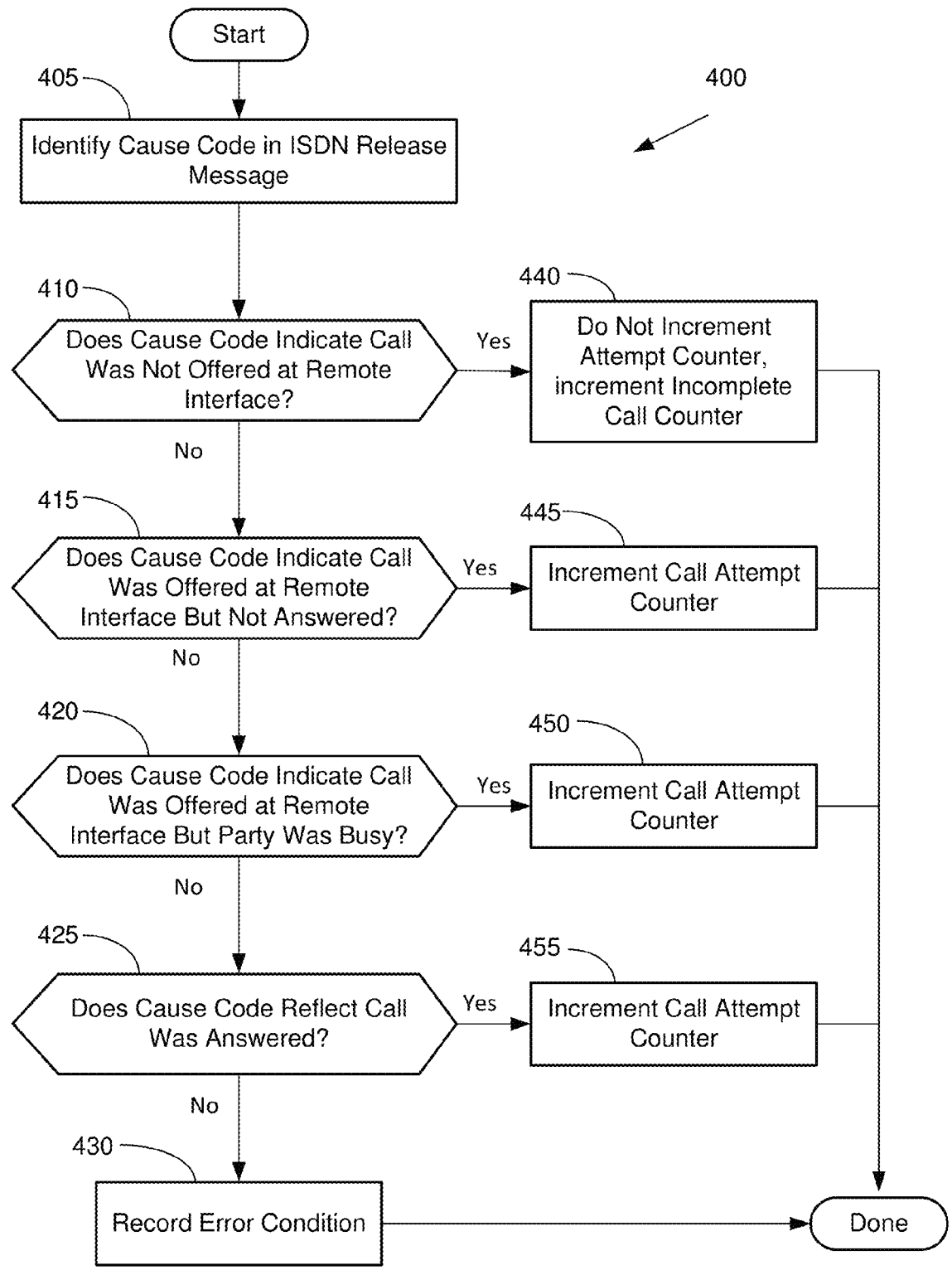
FIG. 4 illustrates one embodiment of a process flow that may be used in a dialer for mapping an ISDN cause code to different counters associated with the called telephone number.

FIG. 4 provides additional detail regarding how the cause code value determines whether the call attempt counter or the incomplete call counter is incremented. Turning to FIG. 4, the process flow 400 begins with receiving an ISDN message, such as a RELEASE message indicating that the call is being released and identifying a cause code therein at operation 405. In other embodiments, other messages or protocols may convey the cause code to the call handler. The particular value of the cause code determines which counter is incremented. A first test may occur in operation 410 in which the cause code indicates that a call was offered at the remote interface. If the cause code indicates that a call was not offered at the remote interface, then the process continues to operation 440 where the incomplete call counter is incremented. Examples of cause codes that reflect the call was not offered to the remote interface include: Cause No. 38—network out of order; Cause No. 41—temporary failure, or Cause No. 42—switching equipment congestion. There may be other cause codes which are treated similarly. These cause codes typically would not result in incrementing a call attempt counter for that number, but would instead result in incrementing the incomplete call counter.

If the test in operation 410 indicates the call was offered to the remote interface, then a test may determined whether the call was answered in operation 415. For example, if a remote party answers the phone and later hangs up, the cause code may reflect normal call clearing. This may correspond to, e.g., Cause No. 16—normal call clearing. If so, then the call attempt counter may be incremented in operation 445.

As indicated previously, the call attempt counter may be associated with a number. In contrast, in some embodiments, the call incomplete counter may be associated with a campaign or some other high level construct. That is, the call incomplete counter may be incremented any time a call made in a campaign, group, or set of agents results in an incomplete call. Specifically, in various embodiments, the call attempt counter is not maintained on a per-telephone number basis, but on an aggregate basis.

If the call was delivered to the remote interface, but the remote party did not answer, then the process continues to operation 420 where a test of the cause code determines if the remote party was busy. Examples of cause codes that reflect the remote party was busy may include: Cause No. 17—user busy. However, other cause codes may reflect that a user is unable or unwilling to accept a call. For example, Cause No. 21—call rejected reflects that the call was offered to the remote interface, but the remote party decided that the call would not be answered. Other value may be mapped as well, such as Cause No. 20—subscriber absent. In these cases, the process may continue to operation 450 where the call attempt counter in incremented, reflecting that the call was offered to the remote interface.

If the call was offered at the remote interface, but the remote party was not busy, then the result may be that the call was answered. This will be indicated by the receipt of a CONNECT message on the ISDN interface, but when the call is cleared, the RELEASE message will contain a cause code, such as Cause No. 16—normal call clearing. Thus, the cause code can still be used to ascertain the call was offered to the remote interface. Other embodiments may recognize that once the call is connected, then the call attempt counter should be incremented at that point, as it is not necessary to wait for the RELEASE message and the cause code to ascertain that the call was offered to the remote interface. In either case, the call attempt counter is incremented in operation 455.

In all cases when the call attempt counter is incremented, or the incomplete call counter in incremented, the process is then completed for that call. Typically, there are no situations in which both the call attempt counter the incomplete call counter are incremented for the same call. That is because the definition of these counters are disjoint and do not overlap. It is possible that other implementations may have a counter which tracks calls that are offered to the remote interface but are not answered. While this counter may also be called an "incomplete call" counter, this would be a different type of counter as the term is defined herein. It is possible that various sub-categories of incomplete call counters could be defined, which would provide additional information as to how many calls occurred that are associated with various sub-categories.

If the cause code in operation 425 does not reflect the call was answered, this may be symptomatic of an error condition. If so, the process may continue to operation 430 where an error condition may be recorded, and if so, neither the call attempt counter nor the call incomplete call counter may be incremented. For example, Cause No 28—invalid number format may indicate that the dialed number is incorrectly formatted. This may suggest that the number used for the call originated attempt was faulty. In such situations, a contact center may opt to define this as an error condition, and not increment either the call attempt counter or the incomplete call counter. Other embodiments may handle such error conditions differently.

In the above examples, variations are possible as to how specific cause codes may be processed and which ones cause the call attempt counter or the incomplete call counter to be incremented. There are a number of cause codes, as seen from FIGS. 2A-2C, and it is not required that all embodiments map each any every the ISDN cause code value, nor in the same manner.

User Administration

The above process reflects how a call that originates from the call handler should process the cause codes to reflect whether the call origination was an incomplete call. Further, it was mentioned above how different cause codes may be interpreted differently by the call handler. This is predicated on first defining in the call handler how the codes are to be mapped. This is typically done by a contact center administrator defining the appropriate mapping. Thus, it is necessary to provide the administrator with the appropriate user interfaces and functionality to define the mappings.

Figure 5:
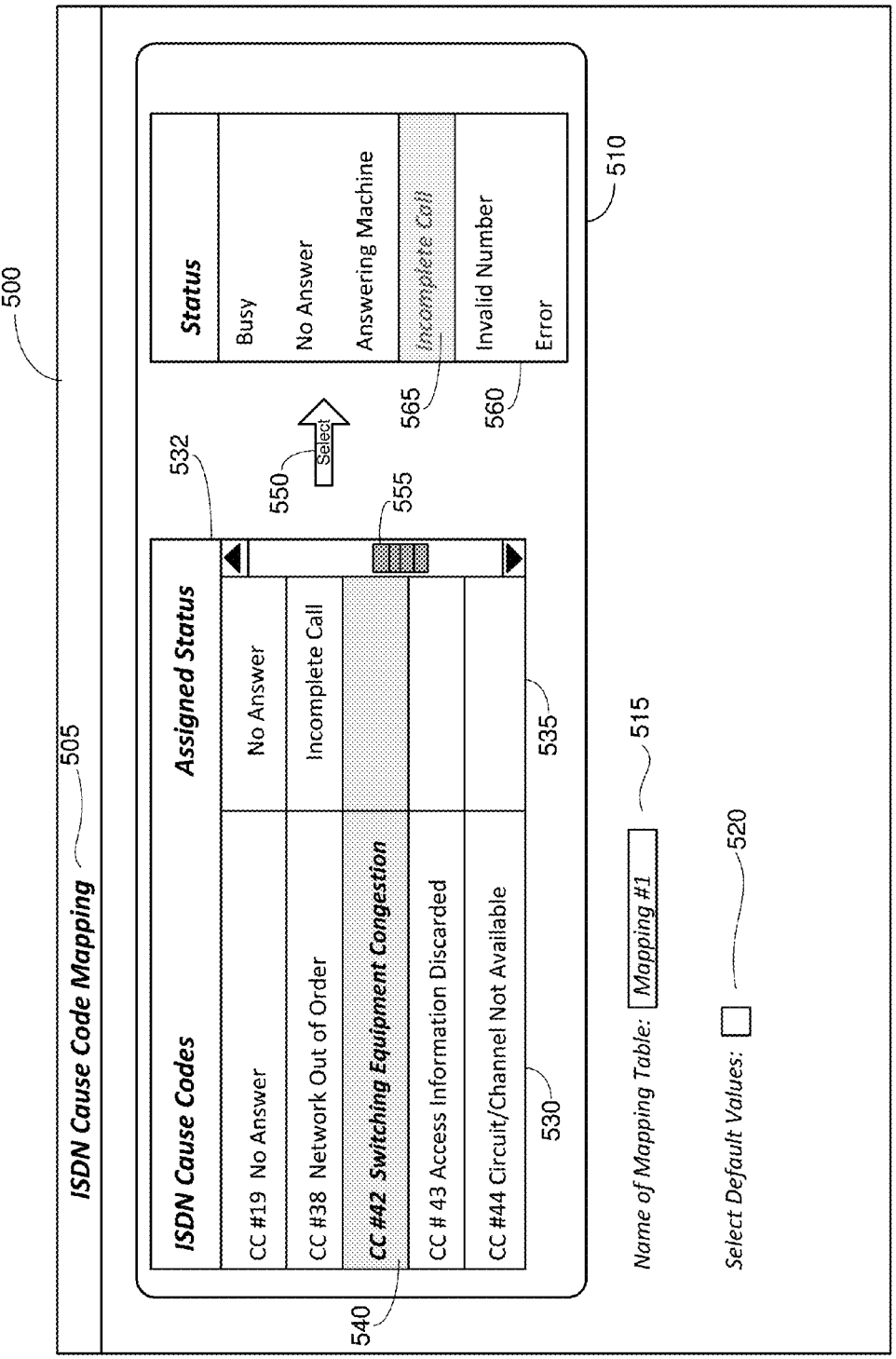
FIG. 5 illustrates one embodiment for a graphical user interface for mapping cause codes to a status value.

One such embodiment of a graphical user interface is shown in FIG. 5. FIG. 5 shows one embodiment of a screen 500 which the administrator may use in defining how cause codes are to be treated. In this embodiment, the ISDN Cause Code Mapping header 505 indicates the purpose of the screen, which is to define the mapping of how the ISDN cause codes are to be mapped. The left visual display area 532 provides a first column 530 of ISDN cause codes. In various embodiments, all the cause codes may be listed in numerical order, or as in this illustration, a subset of the cause codes are shown. A scrolling tool 555 may be used to navigate the list of cause codes. A second column 535 shows the presently assigned status of the cause code. A blank indicates the value has not yet been assigned.

In this embodiment, the "status" indicates how the call handler will process the cause code. The status values are shown in a right visual display area 560, which has a list of the status values. In this embodiment, the different status types can be "busy", "no-answer", "answering machine", "incomplete call", "invalid number", or "error." Briefly, a "busy" indicates that call was offered, and the call attempt counter should be incremented. A "no-answer" indicates that the call was offered, and thus, the call attempt counter should also be incremented. An "answering machine" is a special case of the call being answered, and again the call attempt counter should be incremented. An "incomplete call" indicates that call was note offered to the remote interface, and the call attempt counter should not be incremented. Rather, the incomplete call counter should be incremented. An "invalid number" indicates that the number is not in service, or was incorrectly dialed. In this case, one embodiment may process this such that neither the call attempt nor incomplete call counter is incremented. Finally, an "error" indicates some other error condition, which again, may be configured so as to not increment with the call attempt or incomplete call counter. In some other embodiments, an "error counter" may be defined and incremented.

The user (typically the contact center administrator) may then define for each cause code what should be the corresponding status (i.e., define the mapping). In this embodiment, the left visual display area 532 indicates that cause code #19 (no answer) has been mapped to a "no answer" status. The cause code #38 is mapped to an "incomplete call" status. The next value, cause code #42, is selected for mapping (as indicated by the grayed-out background). The user may use a select the appropriate status code, shown as "incomplete call" 565 as indicated by the grayed-out background, and then used the selector icon 550 to complete the mapping.

The user may define this particular mapping by giving it a name as shown in line 515. This allows various campaigns to use different mapping tables. The user may also select a default table mapping via a checkbox 520. This allows the user to select a default table mapping, alter the name and alter the desired values without having to re-enter all the cause codes. Thus, a new table may be quickly created based on using default values and selectively altering those that are different, and then saving the table under a new name.

It is possible that certain campaigns may desire to process cause codes in different ways. For example, cause code 21 (User Rejected) could be treated as a "busy" status for one campaign, but as an "invalid number" in another campaign. That is because a call that is rejected could be viewed as a call in which the user did not have enough resources to handle the call, which is similar in certain aspects to the concept of "busy." On the other hand, a rejected call could be viewed as a call in which the user did not want to be contacted, and the number should no longer be used in further call attempts, which is similar in certain aspect to an "invalid number". Thus, the ability to define different cause code mappings allows different interpretations to be used in different calling campaigns. This can be accomplished by defining for each campaign which mapping table should be used.

In addition to an administrator providing input for defining the mapping, the administrator may receive outputs related to the call handler processing the cause codes. These outputs may be alerts, status indicators, or other forms of indications. These can provide information about the number of incomplete calls, when they occur, what facilities they are associated with, etc. For example, it can be expected that a PSTN or other voice service provider will occasionally encounter network congestion. This may be caused by switch or facility failures, abnormal facilities loading, etc. Thus, a threshold level can be defined wherein such occasional occurrences are noted, but not immediately alerted to supervisors. On the other hand, a high number of call failures in a network may be reported, allowing the contact center to take corrective action. A high level of network failures may prompt a contact center to inspect facilities, equipment, or select another carrier, route, or service provider. Further, tracking such incomplete calls may be a benchmark to measure the availability or performance of a particular carrier.

One approach for reporting the status of such calls is to utilize a "wallboard" or "dashboard." These refer to displays that provide real time (or near-real time) information about the status of various parameters or operational aspects in a contact center. The wallboard is typically used by the contact center administrator to review the operational status of the contact center. A portion of the wallboard could provide information about call originations and incomplete calls. A wallboard may be constantly displayed, or selected for intermittent viewing.

Figure 6:
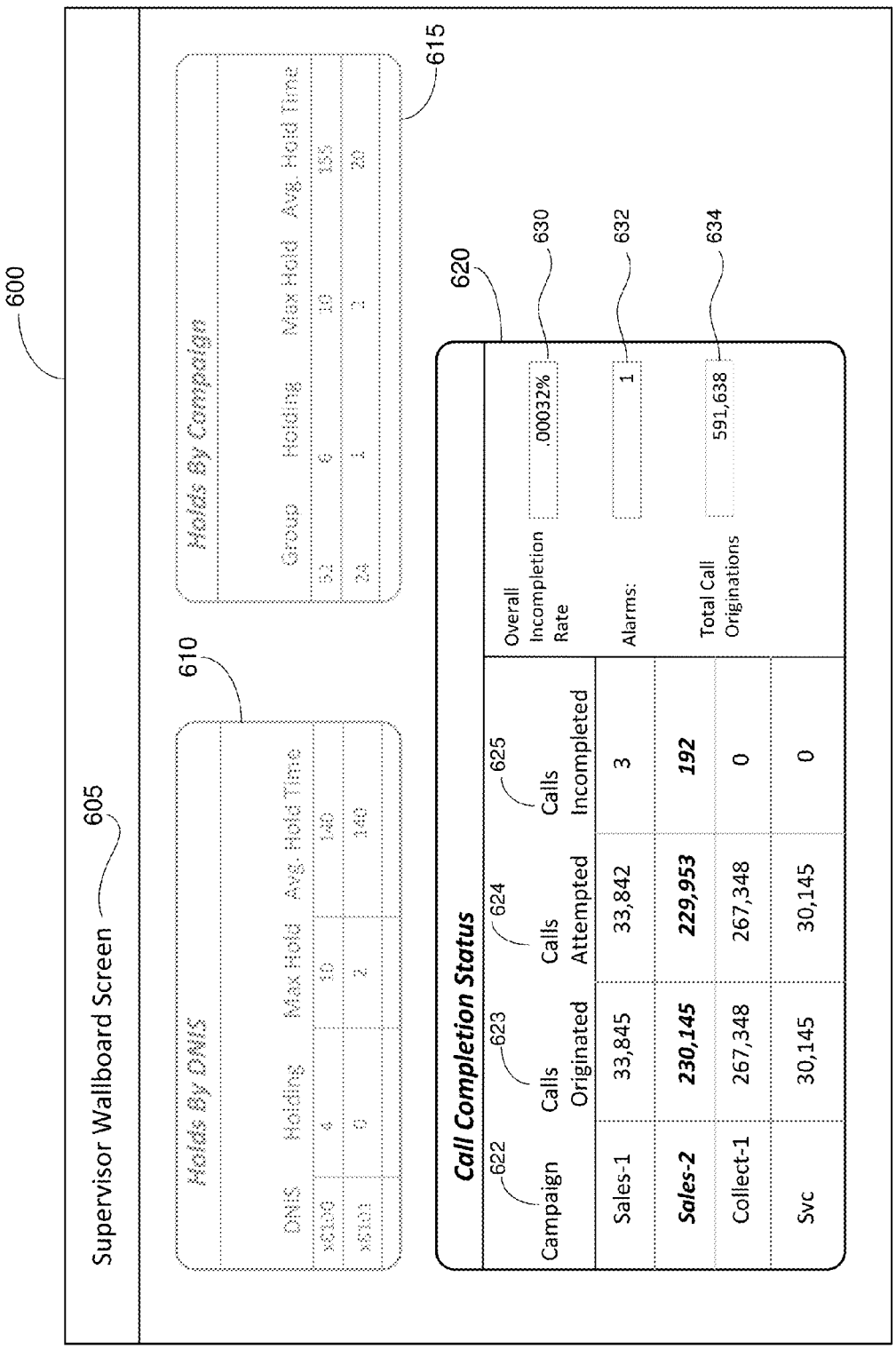
FIG. 6 illustrates one embodiment of a graphical user interface for an administrator's dashboard alert.

Turning to FIG. 6, one embodiment of a wallboard is shown. It should be recognized that there are a variety of graphical layouts that can be used in different implementations of a wallboard. In this embodiment, the wall board is a screen 600, which may be labeled as such via a header 605, which comprises various wallboard elements 610, 615, and 620. A wallboard element is a collection of status information that is grouped and presented collectively. For example, in FIG. 6, one wallboard element 610 indicates the number of calls on hold by DNIS (e.g., by telephone number). Another wallboard element 615 may instead indicate the number of calls holding by at a campaign level. As can be appreciated, there is flexibility in defining what information makes up a particular wallboard element.

FIG. 6 illustrates another wallboard element 620 that provides information regarding the call completion status. In this embodiment, summary information is presented for each campaign, as indicated by a first column 622. A second column 623 may indicate the number of calls that originated for each campaign. A third column 624 may indicate the number of calls that were attempted, e.g., which resulted in the call being offered at the remote interface. Finally, a fourth column 625 may indicate the difference, which represents those calls which originated but did not result in a call attempt. These are defined as incomplete calls. For example, in the Sales-1 campaign, there were 33,845 calls originated of which 33,842 were offered at the remote interface ("calls attempted"). However, 3 of the calls originated did not result in call being offered at the remote interface. In contrast, the Sales-2 campaign had 192 calls which resulted in incomplete calls. This may exceed a threshold, and if so, an alarm may be generated. The other two campaigns, Collect-1 and Svc, had no incomplete calls. Overall summary statistics may be presented as well on the wallboard element, including an overall incompletion rate 630, the number of alarms 632, and a total number of call originations 634.

As noted earlier, the format and context of the wallboard elements may be modified to provide other formats of information that may be deemed useful to the contact center administrator. Thus, other embodiments may provide more or less information. The purpose of the call completion status wallboard element is to provide real time status information about completed/incompleted calls, allowing the administrator to ascertain if a particular service provider is having difficulties completing calls or a particular facility or component requires testing or further investigation. In this particular example, a supervisor may determine that the Sales-2 campaign is having particular issues with a high number of incomplete calls and may chose to investigate this further.

Another tool that an administrator may utilize is consulting various reports that may provide additional information. An "incomplete call report" may summarize various log information, which provides information related to call originations/incomplete calls. One embodiment of a call report is shown in FIG. 7. This report may be printed or visually displayed on a computer terminal to an administrator. In this embodiment, the report 700 comprises a data column 705, a campaign column 710, a number of incompleted calls 715, a percentage of incompleted calls 720, an indication of whether an abnormal condition occurred 725, and the particular ISDN PRI interface and channel which were involved.

The date column 705 is shown in this embodiment as a date, which indicates that a daily summary is provided. In other embodiments, an hourly summary (or some other time period) may be presented. If the report is displayed to the administrator, it may be possible to further review specific calls during that time period, or search for statistics in a user-defined time period. The campaign column 710 provides the names of a particular campaign for which the statistic s are presented for. In some embodiment, a campaign may be limited to a certain number of PRI interfaces or channels thereon, so this may aid in understanding why the incomplete calls may have affected some campaigns, but not others. The number of incomplete calls column 715 indications the absolute number of calls which did not complete. In other words, this is the value of the incomplete call counter. The absolute value may not be informative without knowing the total number of call involved, and to this extent, the percentage column 720 provides a gauge of the relative number of incomplete calls. In addition, the abnormal condition column 725 allows determining whether a threshold level was exceeded (this may be defined either as a percentage or absolute number of incomplete calls that occurred). Exceeding the threshold could cause specific message based notifications or alerts to be sent as a text message, email message, or voice call to the administrator indicating a potentially serious problem. Finally, the PRI channel indicator column 730 indicates which PRI interfaces and channels thereon the incomplete calls occurred. The format may be defined as a particular PRI interface (e.g., interface number 3) and a particular "B" channel on that PRI (e.g., channel 9). If there are multiple channels, then that can be indicated by a plus sign ("+"). In various embodiments, the administrator may be able to "mouse-over" a particular field or value to obtain further information. This presumes the incomplete call report is presented on a computer display as opposed to printed out on paper.

The administrator may be able to also access incomplete call logs, which provides even further detailed call-by-call information as to the cause code received for each call. This information may provide the cause code, the time of the call, facility used, and campaign to allow detailed analysis of which calls failed to complete.

Figure 8:
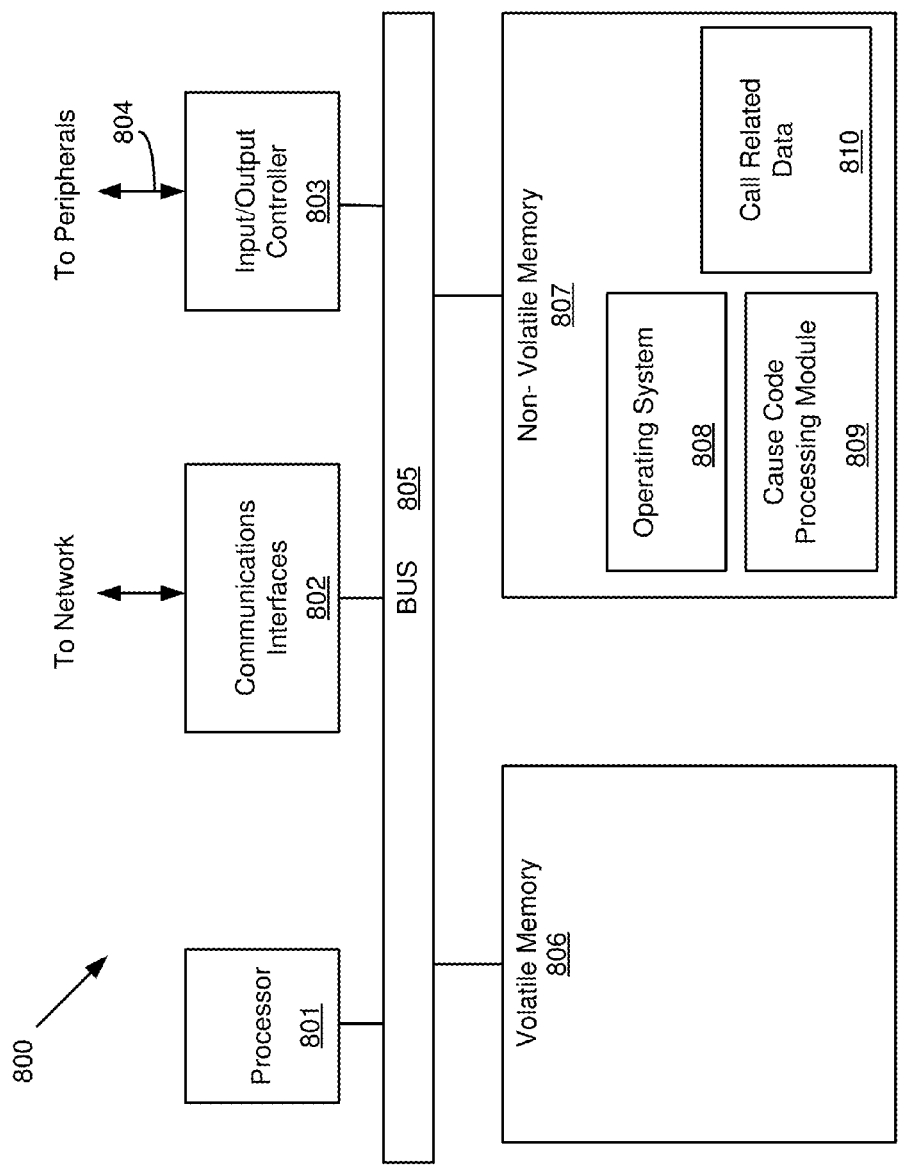
FIG. 8 illustrates one embodiment of a processing system used to implement the concepts and technologies disclosed herein.

FIG. 8—Exemplary Computer Processing Device

As discussed earlier, there may be a number of distinct computer-based processing devices in various embodiments of the present invention, which execute modules for various purposes. For example, there may be an application specific computer processing device for processing cause codes, or a specific module executing in an existing processing device, such as a call handler, that processes the cause codes. This module may generate the data in the logs, or used by the wallboard elements. In other embodiments, these processing devices and/or modules may be combined or distributed on various components. In some embodiments, the functionality of the modules performing the functions described herein may be integrated into FIG. 8 is an exemplary schematic diagram of a computer processing system that may be used in an embodiment for any one of the components disclosed above to practice the technologies or process flows disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Such a computer processing system executing the modules disclosed herein converts that computer processor into a specialized computer processing system. For example, the contact device is specially configured to initiate communications using one or more selected channels.

As shown in FIG. 8, the processing system 800 may include one or more processors 801 that may communicate with other elements within the processing system 800 via a bus 805 or some other form of communication facility. The processor 801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, Von Neumann based computer processing architecture, other circuitry, or the like.

In one embodiment, the processing system 800 may also include one or more communications interfaces 802 for communicating data via the local network, voice service provider, PSTN, or with various external devices. In various embodiments, the communication facility may be via wired, optical, or wireless networks (or a combination thereof). The communication may use a variety of data transmission protocols, such as fiber distributed data interface (FDDI), Ethernet, asynchronous transfer mode ("ATM"), or frame relay. The communications facilities may include any technology used to provide, e.g., ISDN interfaces. Although the interface may be an ISDN PRI interface, in other embodiments, a SIP or other VoIP interface could be used.

The input/output controller 803 may also communicate with one or more input devices or peripherals using an interface 804, such as, but not limited to: a keyboard, a mouse, a touch screen/display input, microphone, pointing device, etc. The input/output controller 803 may also communicate with output devices or peripherals, such as displays, printers, speakers, headsets, banner displays, other components in the contact center, etc. These may be used, in part, to receive data, such as contact lists or profile data retrieved from an external database.

The processor 801 may be configured to execute instructions stored in volatile memory 806, non-volatile memory 807, or other forms of computer readable storage media accessible to the processor 801. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. Specifically, the non-volatile memory 807 may store the cause code processing module 809 that may perform any of the above mentioned process flows, functions, or capabilities. Non-volatile memory may also store operating system code 808 containing instructions for performing the process and/or functions associated with the technologies disclosed herein. The cause code processing module 809 may also access the various call related data 810 previously disclosed. The volatile memory 806 and/or non-volatile memory 807 may be used to store other information including, but not limited to: records, applications, programs, scripts, source code, object code, byte code, compiled code, interpreted code, machine code, executable instructions, cause codes, call logs, summary call attempt statistics, or the like. These may be executed or processed by, for example, processor 801. These may form a part of, or may interact with, the cause code processing module 809. In some embodiments, the cause code processing module 809 may be integrated in another component identified previously.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory computer readable medium comprising instructions that when executed by a computer processor in a call handler in a contact center cause the computer processor to:
    retrieve a call record from a dialing list comprising a telephone number;
    ascertain a value indicated by a call attempt counter is at or below a threshold value, wherein the call attempt counter is associated with the telephone number;
    cause a call to the telephone number to be originated by using an Session Initiated Protocol ("SIP") interface connected to a network service provider;
    receive from the network service provider a cause code parameter associated with the call in an SIP message;
    ascertain a cause code value indicated by the cause code parameter reflects the call was not offered to a remote interface associated with the telephone number;
    not increment the value of the call attempt counter in response to ascertaining the cause code value;
    retrieve the call record at a subsequent time;
    ascertain the value indicated by the call attempt counter is at or below the threshold value; and
    cause another call to the telephone number to be originated.

2. The non-transitory computer readable medium of claim 1, further comprising instructions that cause the computer processor to:
    increment a value indicated by an incomplete call counter in response to ascertaining the cause code value.

3. The non-transitory computer readable medium of claim 2, wherein the cause code value is one of the group consisting of network out of order, a temporary failure, and network congestion.

4. The non-transitory computer readable medium of claim 2, wherein the incomplete call counter reflects a number of incomplete calls originated to a plurality of destination telephone numbers.

5. The non-transitory computer readable medium of claim 1, further comprising instructions that cause the computer processor to:
    retrieve a second call record from the dialing list comprising a second telephone number;
    ascertain a second value indicated by a second call attempt counter is at or below the threshold value, wherein the second call attempt counter is associated with the second telephone number;
    cause originate a second call to be originated to the second telephone number using the SIP interface;
    receive from the network service provider a second cause code parameter associated with the call in a second SIP message on the SIP interface, wherein the second cause code parameter indicates a second cause code value that is different from the cause code value;
    ascertain the second cause code value indicated by the second cause code parameter reflects the second call was offered to a second remote interface associated with the second telephone number; and
    increment the second value indicated by the second call attempt counter in response to ascertaining the second cause code value.

6. The non-transitory computer readable medium of claim 1, further comprising instructions that cause the computer processor to:
    receive from the network service provider a second cause code parameter associated with a second call to the telephone number in a second SIP message on the SIP interface;
    ascertain a second cause code value indicated by the second cause code parameter reflects the second call was offered at the remote interface; and
    increment the value indicated by the call attempt counter in response to ascertaining the second cause code value.

7. The non-transitory computer readable medium of claim 1, further comprising instructions that cause the computer processor to:
    generate an alert to an administrator of the contact center when a value of an incomplete call counter meets or exceeds a threshold value.

8. The non-transitory computer readable medium of claim 7, further comprising instructions that cause the computer processor to:
    identify the SIP interface in the alert.

9. The non-transitory computer readable medium of claim 1, further comprising instructions that cause the computer processor to:
    update a wallboard element on a wallboard indicating a current value of an incomplete call counter.

10. A system for originating a call to a telephone number, comprising:
    a dialer in a contact center interfaced to a telephone network using a Session Initiated Protocol ("SIP") interface comprising a processor configured to:
        retrieve a call record from a dialing list comprising the telephone number;
        ascertain a value indicated by a call attempt counter associated with the telephone number is at or below a threshold value;

cause the call to the telephone number to be originated using the SIP interface connected to a communications service provider;

receive a cause code parameter from a message associated with the call on the SIP interface from the communications service provider;

ascertain a cause code value indicated by the cause code parameter reflects the call was not offered to a remote interface associated with the telephone number;

not increment the call attempt counter in response to ascertaining the cause code value;

retrieve the call record at a subsequent time;

ascertain the value indicated by the call attempt counter is at or below the threshold value; and cause another call to the telephone number to be originated.

11. The system of claim 10, wherein the processor is further configured to:

increment a value indicated by an incomplete call counter after ascertaining the cause code value.

12. The system of claim 11, wherein the incomplete call counter reflects a number of incomplete calls associated with a plurality of telephone numbers, including the telephone number.

13. The system of claim 10, wherein the processor is further configured to:

retrieve a second call record from the dialing list comprising a second telephone number;

ascertain a second value indicated by a second call attempt counter associated with the second telephone number is at or below the threshold value;

originate a second call to the second telephone number using the SIP interface;

receive a second cause code parameter from a second message associated with the second call on the SIP interface, wherein the second cause code parameter indicates a second cause code value that is different from the cause code value;

ascertain the second cause code value indicated by the second cause code parameter reflects the second call was offered to a second remote interface associated with the second telephone number; and increment the second value indicated by the second call attempt counter in response to ascertaining the second cause code value.

14. The system of claim 10, further comprising a wallboard display, wherein the processor is further configured to:

update a wallboard element on the wallboard display to indicate the value of the call attempt counter.

15. The system of claim 10, wherein the processor is further configured to:

generate an alert to an administrator of the contact center when a value of an incomplete call counter meets or exceeds a threshold value.

16. A method for originating a call to a telephone number by a call handler comprising a dialer in a contact center, comprising:

retrieving a call record from a dialing list comprising the telephone number;

ascertaining a value indicated by a call attempt counter associated with the telephone number is at or below a threshold value;

originating the call to the telephone number using a Session Initiated Protocol ("SIP") interface connected to a communications service provider;

receiving a cause code parameter from a message associated with the call on the SIP interface from the communications service provider;

ascertaining a cause code value indicated by the cause code parameter reflects the call was not offered to a remote interface identified by the telephone number;

not incrementing the value indicated by the call attempt counter maintained in the call handler in response to ascertaining the cause code value;

retrieving the call record at a subsequent time;

ascertaining the value indicated by the call attempt counter is at or below the threshold value;

originating another call to the telephone number; and incrementing the value indicated by the call attempt counter.

17. The method of claim 16, wherein the cause code value is one of the group consisting of network out of order, temporary failure, and network congestion.

18. The method of claim 16, further comprising the step of:

updating a wallboard element on a wallboard display to indicate the value of the call attempt counter.

19. The method of claim 16, further comprising the step of:

generate an alert to an administrator of the contact center when a value of an incomplete call counter meets or exceeds a threshold value.

20. The method of claim 16, further comprising the step of:

incrementing a value indicated by an incomplete call counter after ascertaining the cause code value, wherein the incomplete call counter reflects a number of incomplete calls associated with a plurality of telephone numbers, including the telephone number.

* * * * *